United States Patent
Tally

(10) Patent No.: US 6,488,288 B2
(45) Date of Patent: *Dec. 3, 2002

(54) CHUCK KEY TOOL

(75) Inventor: Kevin L. Tally, Clarinda, IA (US)

(73) Assignee: Lisle Corporation, Clarinda, IA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/703,889

(22) Filed: Nov. 1, 2000

(65) Prior Publication Data

US 2002/0067009 A1 Jun. 6, 2002

(51) Int. Cl.$^7$ .......................... B25B 13/44; B23B 31/06
(52) U.S. Cl. .......................... 279/147; 81/16; 279/149; 248/683; 76/114
(58) Field of Search ................ 279/147, 149; 81/16, 3.25, 180.1, 684, DIG. 1; 248/206.5, 683; 164/129, 350; 76/114, 119, DIG. 3

(56) References Cited

U.S. PATENT DOCUMENTS

| 2,720,799 | A | * | 10/1955 | Pfost .......................... 76/114 |
| 3,109,619 | A | * | 11/1963 | Krug et al. ............... 248/206.5 |
| 3,145,477 | A | * | 8/1964 | Morrison ................. 248/206.5 |
| 4,467,677 | A | | 8/1984 | Grifford |
| 4,979,407 | A | * | 12/1990 | Hernandez et al. .......... 81/3.09 |
| 4,981,167 | A | | 1/1991 | Anderson |
| D326,036 | S | | 5/1992 | Anderson |

\* cited by examiner

*Primary Examiner*—Steven C. Bishop
(74) *Attorney, Agent, or Firm*—Banner & Witcoff, Ltd.

(57) ABSTRACT

A chuck key tool includes a hub with a magnet positioned on the hub. Spokes project radially from the hub and include chuck keys defined at the end of each of the spokes. The magnetic hub enables storage and easy access to the chuck key tool.

1 Claim, 1 Drawing Sheet

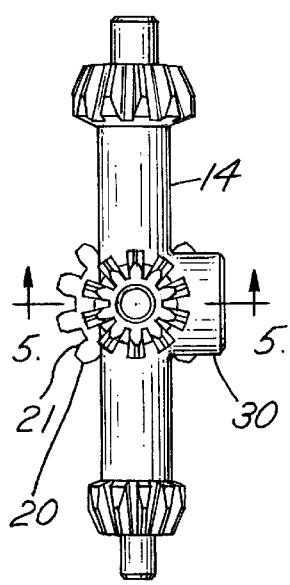
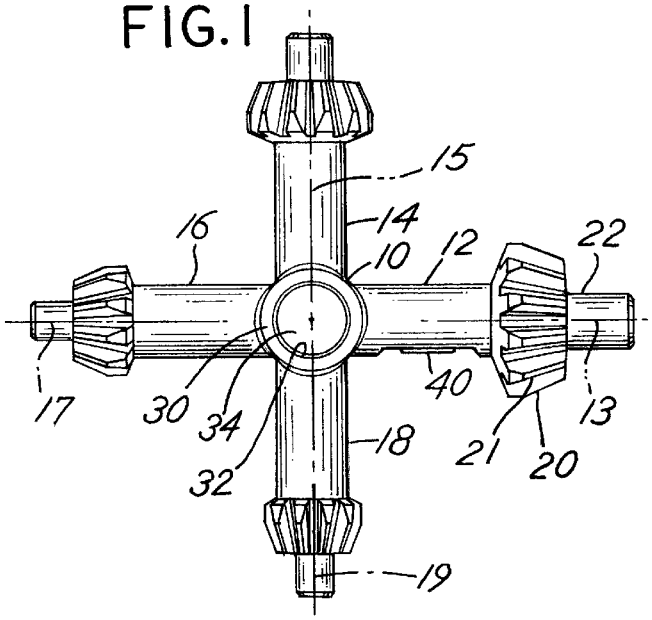
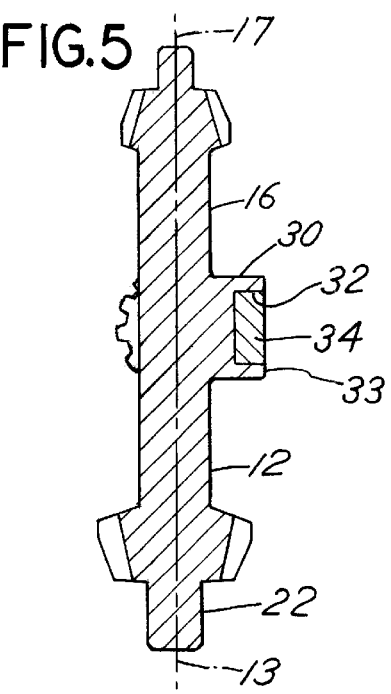
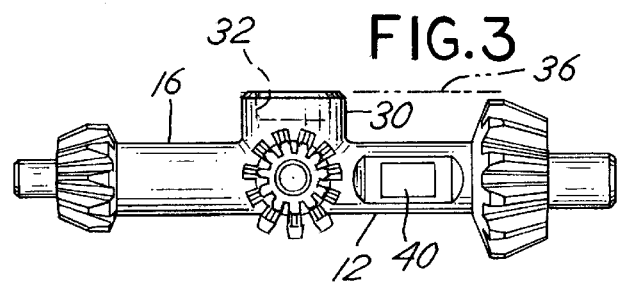
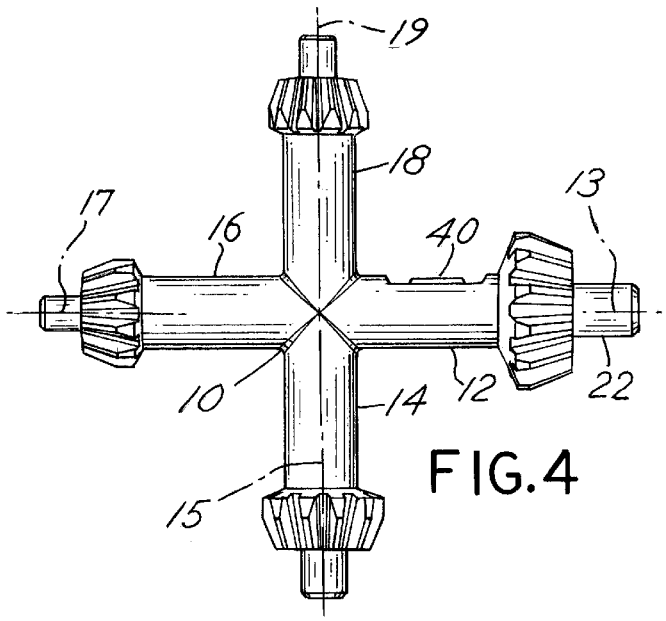

CHUCK KEY TOOL

BACKGROUND OF THE INVENTION

This invention relates to a chuck key tool, and more particularly, to a chuck key tool having a number of separate chuck keys, each one being mounted on a separate spoke emanating from a central hub.

Chuck keys are utilized to rotate the chuck of a power drill or other similar type of tool in a manner which permits insertion and retention of a drill bit or other bit type tool. When repairing vehicles, or when working at a construction site, a worker typically requires the use of tools having various sizes of chucks, thus requiring various chuck keys in accordance with the chuck size of the tool being employed. U.S. Pat. No. 4,467,677 discloses a chuck key tool which includes a plurality of separate chuck keys attached together, each chuck key being a different size so that a tool operator may employ the appropriate chuck key for the appropriate chuck size of a drill or other tool. U.S. Pat. No. 4,981,167 also discloses a similar chuck key tool construction.

While such constructions are quite useful, one of the problems associated with the use of chuck keys is that they are often misplaced or lost. Single chuck keys are typically retained on the cord of the power tool by insertion and retention in a elastic or plastic holder. Such holders are not fool proof and often result in the accidental loss of such a chuck key. Chuck key tools of the type depicted in the referenced patents do not lend themselves to attachment or incorporation in holding devices associated with tools.

Thus, there has developed a need for a chuck key tool comprising multiple chuck keys and having a design which facilitates their storage, retention and accessibility.

SUMMARY OF THE INVENTION

Briefly, the present invention comprises a chuck key tool which includes a hub with at least two projecting spokes from the hub. Each spoke defines an axis extending generally radially outwardly from the hub. Each spoke terminates with a separate chuck key formed at the end thereof, the teeth of the chuck key extending radially from the axis of the spoke and a guide pin for the chuck key extending axially from the spoke. The hub further includes a formed pocket therein with magnet material in the pocket. The face of the pocket is in a plane which does not intersect with the teeth of the chuck keys. In this manner, the magnetic material facilitates placement of the chuck key on a magnetizable surface including the housing of a tool, for example, or a work chest for ease of accessibility by a mechanic or other tradesman. In a preferred embodiment, four spokes equally spaced from one another are arrayed in a coplanar array with a separate chuck key formed at the end of each spoke and with a magnetic pocket, filled with magnetic material, positioned transversely to the plane of the chuck key spokes.

Thus, it is an object of the invention to provide an improved chuck key tool having multiple chuck keys.

It is a further object of the invention to provide a chuck key tool having a specially formed magnetic pocket which enables placement of the tool on a flat surface for ease of storage and accessibility.

Yet another object of the invention is to provide a chuck key tool which is inexpensive and can be manufactured using casting and other metal forming techniques.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 1 is a top plan view of the chuck key tool of the invention;

FIG. 2 is a side elevation of the tool of FIG. 1;

FIG. 3 is a further side elevation of the tool of FIG. 1;

FIG. 4 is a bottom plan view of the tool of FIG. 1; and

FIG. 5 is a cross sectional view of the tool of FIG. 2 taken along the line 5—5.

DESCRIPTION OF THE PREFERRED EMBODIMENT

Referring to the figures, the chuck key tool includes a hub 10 with four projecting spokes in the form of rods 12, 14, 16 and 18 projecting from the hub 10. Each spoke 12, 14, 16 and 18 defines a separate longitudinal axis 13, 15, 17 and 19, respectively. The axes 13, 15, 17, and 19 are all coplanar, thus, making the rods 12, 14, 16 and 18 coplanar.

At the end of each rod 12, 14, 16 and 18 a chuck key is formed comprising a geared or tooth. section, for example, tooth section 20 associated with rod 12. Further, there is an axially extending pin 22. The tooth section 20 comprises a series of teeth 21 which extend generally radially outward from the axis 13. The pin 22 is coaxial with the axis 13. In this manner, the chuck key comprised of the teeth 21 and pin 22 may be inserted into the chuck of a tool that is appropriately sized and thus manipulate the chuck to close the chuck on a drill or other tool. Each of the spokes 12, 14, 16 and 18 include a similar tooth and pin construction. Each of the tooth and pin constructions, however, are differently sized in order that the chuck key tool itself may accommodate various sized chucks. In practice, more than one chuck key tool may be required inasmuch as there are more than four chuck sizes.

Also in practice, it may be appropriate to provide a chuck key tool having only two sets of teeth, pins and spokes thereon. The preferred embodiment comprises four chuck keys. However, two, three, four or more may be utilized depending upon the requirements and needs of the users of such tools. In the embodiment show, therefore, four spokes, 12, 14, 16 and 18 are depicted. The spokes 12, 14, 16 and 18 are spaced equally or by a 90° angle and are all coplanar. Thus, it is possible to have the spokes in a non-coplanar array, though coplanar arrangement is preferred.

Further, an important feature of the invention is the construction of the hub 10. The hub 10 includes a pocket section 30 which extends outwardly or transversely from the plane defined by the axes 13, 15, 17 and 19. The pocket 30 is centrally located at the hub 10 and includes a pocket recess 32 into which a disc shaped magnet 34 is positioned. Thus, the pocket 30 includes a counterbore 32 for receipt of a disc magnet 34. In the preferred embodiment, the magnetic material is neodymium. The hub or pocket 30 defines a plane of a surface 36. The surface or plane 36, when projected from the hub 10, extends above and does not intersect any of the teeth 21 of the separate chuck tools. As a result, the surface 33 of the pocket 30, and more particularly, the plane 36 defined by that surface, results in a tool which, when attached to a flat surface, will not interfere with, or engage with the teeth 21 of the separate chuck keys. The tool may, thus, be stored on a flat metal surface which is magnetizable and the teeth 21 of the separate chuck keys will not engage with or otherwise prevent placement of the tool on such a surface.

In the figures, the surface 33 and plane 36 defined thereby are parallel to the plane defined by the intersecting axes 13, 15, 17 and 19. That is, the preferred embodiment, however, the plane 36 need not be parallel thereto. Rather, the plane may be at some angle with respect thereto. Importantly, however, the plane 36 does not intersect with or conflict with the radial extent of teeth 21 associated with any spoke, e.g. spoke 12.

In the embodiment depicted, a single pocket arranged on one side of the hub 10 is depicted. It is possible to provide for pockets extending in opposite directions so that the worker would be able to attach the tool to a magnetizable surface using the magnet and the magnet pocket extending in either direction. This would provide for further convenience of construction inasmuch as the worker would not have to reorient the chuck key tool if he were placing the wrong side against the flat surface of magnetizable material. Additionally, if the spokes, such as spokes 12, 14, 16 and 18, were not coplanar, the direction and extent of the pocket 30 could be adjusted to accommodate the angular disposition of the spokes and the chuck keys.

When manufacturing the chuck key tool depicted, it is noted that the tool can be made by a casting process wherein a gate 40 is defined in the side of one of the spokes, such as spoke 12. Thus, there are many variations with respect to the construction of such a tool. Placement of the magnetic material and the pocket which retains the magnetic material at the hub, however, constitutes an important part of the invention. Thus, the invention is to be limited only by the following claims and equivalents thereof.

What is claimed is:

1. A chuck key tool comprising, in combination:

a unitary tool consisting essentially of a solid metal central hub with at least three projecting spokes, each spoke defining an axis extending radially outward from the hub, said axes being coplanar, each one of said spokes terminating in a separate distinctly sized chuck key, each key having teeth and a guide pin, each of said teeth extending radially from the associated spoke axis outwardly to a radial extent from the projecting spoke, each said guide pin extending longitudinally outwardly from each spoke along the associated spoke axis, and said hub positioned at the intersection of the axes and defining a solid center for the tool, said hub center including an integrally cast magnet pocket defined by a cylinder with a cylindrical counterbore transverse to the spoke axes, said cylinder extending outwardly and having an axis centered on the intersection of the axes of said spokes, from the hub center, said spokes, hub and teeth comprising a unitary metal casting having a gate located on a spoke intermediate the teeth and the hub; and a separate round, disc shaped magnet mounted in the pocket, said pocket and magnet defining a face in a plane parallel to the plane defined by the axes and spaced from the intersection of the spoke axes by a distance greater than the maximum radial extent of said teeth and providing a flat planar tool surface which supports the tool on a flat surface with the teeth of the tool spaced from the said flat surface.

* * * * *